United States Patent [19]

Webb et al.

[11] Patent Number: 5,041,514

[45] Date of Patent: Aug. 20, 1991

[54] POLYMERIC REACTION PRODUCTS OF BIPHENOLS AND ORGANOSILICON MATERIALS AND METHOD FOR MAKING

[75] Inventors: Jimmy L. Webb, Ballston Lake; Susan A. Nye, Feura Bush; Marsha M. Grade, Schenectady, all of N.Y.

[73] Assignee: General Electric Company, Schenectady, N.Y.

[21] Appl. No.: 497,155

[22] Filed: Mar. 21, 1990

Related U.S. Application Data

[63] Continuation-in-part of Ser. No. 353,713, May 18, 1989, abandoned.

[51] Int. Cl.$^5$ .............................................. C08G 77/04
[52] U.S. Cl. ...................................... 528/25; 528/29; 528/38; 525/477
[58] Field of Search .......................... 528/25, 29, 38; 525/477

[56] References Cited

U.S. PATENT DOCUMENTS

| | | | |
|---|---|---|---|
| 3,522,326 | 7/1970 | Bostick et al. | 260/823 |
| 3,539,655 | 11/1970 | Strachan et al. | 260/824 |
| 3,539,656 | 11/1970 | Noshay et al. | 260/824 |
| 3,668,273 | 6/1972 | Krantz | 260/824 |
| 3,737,479 | 6/1973 | Haaf | 260/824 |
| 3,960,985 | 6/1971 | Cooper | 260/874 |

OTHER PUBLICATIONS

Curry et al., Journal of Applied Polymer Science, vol. 9, pp. 295-311 (1965).
Article (in German) Gegrundet von Gerhard, Kruss, et al., Zeitschrift Fur Anorganische Und Allgemeine Chemie.
Article-Je Curry and JD Byrd, Silane Polymers of Doils-Journal of Applied Polymer Science, vol. 9, pp. 295-311 (1965).
Robert MacFarlane, Jr. and Eugene S. Yankura-Quarterly Progress Report-Feb. 1, 1963-Apr. 30, 1963-Synthesis of Regulated Structure Polyphenylether-Siloxane Block Copolymers-Naugatuck Chemical, pp. 1-17.

*Primary Examiner*—Melvyn I. Marquis
*Attorney, Agent, or Firm*—William A. Teoli; James C. Davis, Jr.; William H. Pittman

[57] ABSTRACT

Poly(silyoxytetraalkylbiphenyleneoxide)s are provided resulting from the reaction between a tetraalkylbiphenol, such as tetramethylbiphenol and an organosilicon material such as dimethyldichlorosilane or octamethylcyclotetrasilazane. The poly(silyloxytetraalkylbiphenyleneoxide)s are flame retardant film-forming materials useful as high performance injection moldable thermoplastic and dielectrics.

17 Claims, No Drawings

POLYMERIC REACTION PRODUCTS OF BIPHENOLS AND ORGANOSILICON MATERIALS AND METHOD FOR MAKING

BACKGROUND OF THE INVENTION

This application is a continuation in part of copending application Ser. No. 07/353,713 filed May 18, 1989 and now abandoned.

The present invention relates to hydrolytically stable poly(silyloxytetraalkylbiphenyleneoxide)s which are convertible into transparent, flame retardant self-extinguishing films.

Prior to the present invention, as shown by Curry et al., for "Silane Polymers of Diols", *Journal of Applied Polymer Science*, Vol. 9, pp. 295-311 (1965), various polymeric materials were prepared by reacting a silyl diamine with various organic diols such as biphenol. It was found by Curry et al. that a polymer containing biphenyl linkages had desirable properties. These materials were found to be stable up to 600° C. and fibers with fairly good tenacity (0.5 grams/den) could be drawn directly and continuously from the polymer melt.

Organopolysiloxane-polyphenylene oxide block copolymers were made by the procedure shown by Krantz, U.S. Pat. No. 3,668,273 by reacting polyphenylene oxide segments with polydiorganosiloxane segments terminated with amine groups. These materials are useful in the formation of oriented films and fibers and as plasticizers for polyphenylene oxide. An additional procedure for making organopolysiloxane-polyphenylene oxide block copolymers is shown by Bostick et al., U.S. Pat. No. 3,522,326, which is directed to graft copolymers useful for making molded, extruded, or otherwise shaped articles, such as films and fibers having valuable mechanical and electrical properties. Although the procedures of the prior art have provided a variety of silicone-aryleneoxy block copolymers having valuable thermoplastic properties and useful in a variety of applications, additional properties such as hydrolytic stability and flame retardance are required by the thermoplastic industry.

SUMMARY OF THE INVENTION

The present invention is based on the discovery that a poly(silyloxytetraalkylbiphenyleneoxide), made by condensing tetramethylbiphenol (TMBP) and a difunctional silane, such as dimethyldichlorosilane, has improved hydrolytic stability, and is high molecular weight injection moldable material exhibiting flame resistant properties and convertible to tough transparent flexible films at elevated temperature and pressure.

STATEMENT OF THE INVENTION

There is provided by the present invention poly(silyloxybiphenyleneoxide)s consisting essentially of chemically combined groups of the formula,

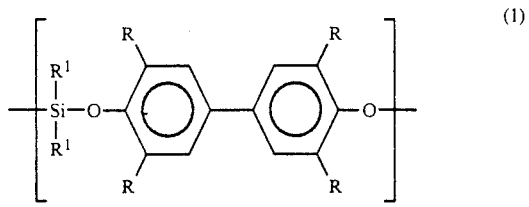

where R is selected from the same or different $C_{(1-8)}$ alkyl radicals, and $R^1$ is selected from the same or different $C_{(1-13)}$ monovalent hydrocarbon radicals and $C_{(1-13)}$ monovalent hydrocarbon radicals substituted with monovalent radicals inert during condensation.

In a further aspect of the present invention, there is provided a method for making poly(silyloxytetraalkylbiphenyleneoxide)s having chemically combined groups of formula (1) comprising, (A) effecting reaction between a tetraalkylbiphenol of the formula,

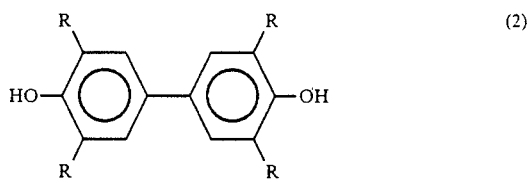

and a difunctional organosilicon material selected from the class consisting of a polyorganosilazane, a cyclopolyorganosilazane, and an organosilane of the formula,

(B) recovering the resulting poly(silyloxytetraalkylbiphenyleneoxide) from the mixture of (A), where R and $R^1$ are as previously defined, and X is a hydrolyzable radical, and is preferably chloro.

Radicals included by R of formulas (1) and (2) are alkyl radicals, such as methyl, ethyl, propyl, butyl, pentyl and hexyl; radicals included by $R^1$ are, for example, R radicals as previously defined, and substituted R radicals, such as trifluoropropyl, cyanoalkyl, such as cyanoethyl and cyanopropyl; alkenyl radicals such as vinyl and propenyl; cycloaliphatic radicals, such as cyclopentyl, and cyclohexyl. $R^1$ also can be aryl radicals, such as phenyl, xylyl, tolyl, naphthyl and anthryl; and halogenated aryl radicals, such as chlorophenyl and bromotolyl, as well as nitroaryl radicals, such as nitrophenyl and nitrotolyl.

Radicals included within X of formula (3) are for example halo, such as chloro, amino, amido, imido, ureido, alkoxy and acyloxy.

Some of the organosilazanes, including cyclopolyorganosilazanes which can be used in the practice of the present invention are difunctional silazanes shown by Martellock U.S. Pat. No. 3,243,404 and Rochow Chemistry of the Silicones, Second Edition 1951, John Wiley & Sons New York, Table 10, page 186 which are incorporated herein by reference. For example there can be used hexamethylcyclotrisilazane, and octamethylcyclotetrasilazane.

Organosilanes which are included within formula (3) are for example

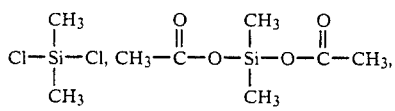

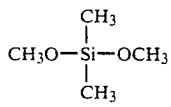

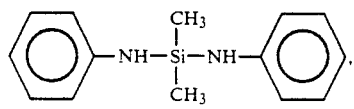

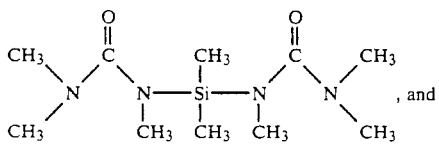

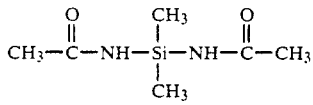

In the practice of the present invention, the poly(-silyloxytetraalkylbiphenyleneoxide)s of formula (1) can be made by condensing a tetraalkylbiphenol of formula (2), with the organosilicon material. Depending upon the nature of the organosilicon material, condensation can be effected in the presence of an organic solvent, under neat conditions, and in the presence or absence of an acid acceptor. For example, if the organosilicon material is a halosilane, such as dimethyldichlorosilane, an organic solvent, such as toluene or ortho-dichlorobenzene can be used in combination with an acid acceptor, such as triethylamine. In instances where a high boiling solvent is used, such as ortho-dichlorobenzene or chloronaphthalene, an acid acceptor is not necessary. High boiling solvent also can be used with organosilazanes, or cycloorganosilazanes can be used as the organosilicon material without a solvent under melt polymerization conditions.

Suitable organic solvents which can be used in the practice of the present invention are for example, toluene, ortho-dichlorobenzene, chloro-naphthalene, and diphenylether.

Among the acid acceptors which can be used are, for example, triethylamine, dimethylbutylamine, N-methylpyrrolidine, and trimethylamine. If desired, a chainstopper such as 2,6-xylenol can be introduced to control the molecular weight of the polymer.

Recovery of the poly(silyloxytetraalkylbiphenyleneoxide) can be effected by allowing the mixture to cool and pouring it into a precipitating solvent, such as isopropanol, or by removal from the reactor vessel in the case of high solids or melt polymerization. The mixture can then be filtered and the product washed with additional organic solvent and dried at elevated temperatures.

The poly(silyloxytetraalkylbiphenyleneoxide)s of the present invention have been found to be flame retardant. These polymers can have a molecular weight in the range of 5,000 to 1,000,000. The poly(silyloxytetramethylbiphenyleneoxide)s have a Tg in the range of about 120° C. to 138° C. and a Tm of about 280° C. They can be blended with inert fillers, such as glass fiber, mica, clay, talc, titanium dioxide and silica in a proportion of from 1 to 200 parts by weight of filler, per 100 parts of polymer.

In order that those skilled in the art will be better able to practice the present invention, the following examples are given by way of illustration and not by way of limitation. All parts are by weight unless otherwise indicated.

EXAMPLE 1

A mixture of 24.2 grams (0.100 mole) of tetramethylbiphenol (TMDP), 12.89 grams (0.100 mole) of dimethyldichlorosilane and 300 ml. of orthodichlorobenzene was refluxed and stirred for 4 hours under a nitrogen atmosphere and 0.05 mole HCl was discharged from the mixture. The temperature of the mixture rose from about 165° C. to about 180° C. The reaction mixture was then cooled to about 70° C., and 27.9 ml. (0.200 mole) of triethylamine was added. The mixture thickened slightly after the addition of the triethylamine and 0.1230 gram (0.5 mole percent) of 2,6-xylenol was added as a chainstopper. The reaction mixture was held at 70°-80° C. and another 5 grams of dimethyldichlorosilane in 55 ml. of orthodichlorobenzene was added very slowly. The solution became very viscous after 5 ml. of the dimethyldichlorosilane solution in orthodichlorobenzene was added. The reaction mixture was then cooled to about 40° C. and poured slowly into 3,000 ml. of isopropanol. A white fibrous solid precipitated from the mixture. The product was collected and twice reslurried with 1,000 ml. of isopropanol. A filter cake of the product was collected after the final wash and pressed with dental dam to express as much solvent as possible. The product was then dried at 140° C. in a vacuum oven for 4 hours. There was obtained 26.5 grams (89%) yield of product. Based on method of preparation and GPC analysis, the product was a poly (dimethylsilyloxytetramethylbiphenyleneoxide) having a molecular weight of about 202,000. It had a Tg of 126° C. and $T_m$ of 260° C. There was obtained a transparent flexible film when the polymer was pressed at 290° C. and a pressure of 1-2 tons for about 30 seconds. The product was a useful dielectric material and found to be a flame resistant moldable thermoplastic.

EXAMPLE 2

A mixture of 300ml of ortho-dichlorobenzene, 24.2 grams (0.100 mole) of tetramethylbiphenol, 0.061 gram (0.0005 mole) of 2,6-xylenol and 21.8 grams (0.215 mole) of triethylamine was heated under a nitrogen atmosphere at 80° C. and 12.89 grams (0.100 mole) of dimethyldichlorosilane was added over a 10 minute period. The reaction mixture was then cooled and poured into 2,000 ml. of isopropanol to effect precipitation of product. There was obtained a white fibrous solid which was reslurried with 2,000 ml. of isopropanol. The product was then collected and pressed free of solvent with a dental dam. The product was then dried in a vacuum oven at 130° C. for 3 days. There was obtained 27.6 grams (92.6% yield) of a poly (dimethylsilyloxytetramethylbiphenyleneoxide) having a molecular weight of M(W)43,000. The polymer was molded in accordance with the method of Example 1. There was obtained a transparent tough film useful as a flame retardant dielectric material.

EXAMPLE 3

There was added 103.2 parts of dimethyldichlorosilane to a solution at 80° C. of 193.6 parts of tetramethylbiphenol and 240 parts of orthodichlorobenzene which had been dried by refluxing the mixture. The resulting mixture was then refluxed under nitrogen and the HCl emission was monitored. After two hours, the temperature of the mixture was 193° C. and 50% of the HCl had been removed. After 6 hours, sufficient ortho-dichlorobenzene was removed to obtain 80% solids and increase the reflux temperature. The reaction was continued for eleven hours before all of the HCl had been removed at 295° C. Excess dimethyldichlorosilane was added to increase molecular weight. There was obtained a product having an Mn of 13,843 and an M(W) of 33,848. Its dispersivity was found to be 2.45. Based on method of preparation and GPC analysis, the product was an injection moldable poly (dimethylsilyloxytetramethylbiphenyleneoxide).

EXAMPLE 4

A mixture of 48.4 g of tetramethylbiphenol, 14.64 g of octamethycyclotetrasilazane and 50 ml of orthodichlorobenzene was refluxed under nitrogen. The emission of ammonia was monitored. After five hours of reflux at 295° C. there was obtained a poly (dimethylsilyloxytetramethylbiphenyleneoxide) having a M(n) of 28,244, a M(W) of 87,286 and a dispersivity of 3.09. The MW of the polymer was confirmed by GPC.

In addition to the above examples showing polymeric reaction products of biphenols and organosilicon materials, a procedure for making polyphenylene ether-siloxane block copolymers is shown by McFarland, et al for Synthesis of Regulated Structure Polyphenylene Ether-Siloxane-Block Copolymers, Quarterly Progress Report, Feb. 1, 1963-Apr. 3, 1963 of the Naugatuck Chemical Company of Naugatuck, Conn. which is incorporated herein by reference.

Percent "Char Yield" also has been identified as an important factor in the evaluation of the flame retardance of polymeric reaction products of biphenols and organosilicon materials. As used hereinafter, Char Yield means the weight % residue remaining upon termination of the complete burning of the polymeric reaction product being evaluated. Char Yield can be measured by weighing the % residue after complete burning of a 1.5×0.5×1/16th inch molded sample of the polymeric reaction product placed 2 inches from a radiant heat panel providing at least a 3.5 watts/centimeter square heat flux. The % Char or Char Yield is done at a radiant heat source setting of 80 or 90 volts corresponding to 6.5–7.5 watts/cm² heat flux depending upon what was needed to sustain combustion.

In addition to formula 1, polymeric reaction products of biphenols and organosilicon materials also were prepared consisting essentially of chemically combined groups of the formula,

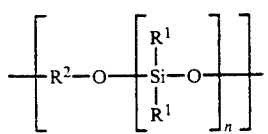

(4)

by, (C) effecting reaction between a biphenol of the formula, $$HO-R_2-OH \quad (5)$$

and a difunctional organosilicon material selected from the class consisting of a polyorganosilazane, a cyclopolyorganosilazane, a bisureidosilane, an $\alpha,\omega$ bisaminopolysiloxane, and an organosilane of formula (3), and (D) recovering from (C), the polymeric reaction product of the biphenol and difunctional organosilicon material, where $R^1$ is as previously defined, $R^2$ is a member selected from the class consisting of:

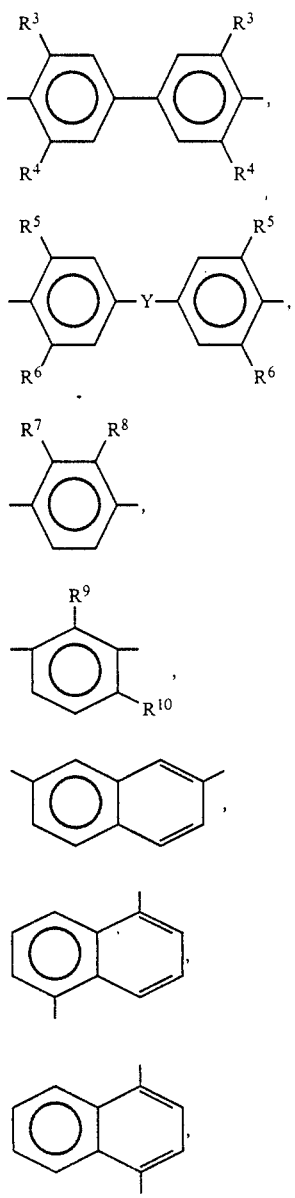

-continued

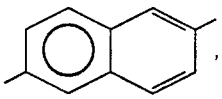

$R^3$, $R^4$, $R^5$, $R^6$, $R^7$, $R^8$, $R^9$, and $R^{10}$ are members selected from the class consisting of the same or different radicals consisting of hydrogen and $C_{(1-13)}$ monovalent hydrocarbon radicals included within $R^1$, Y is a member selected from the class consisting of $-C(CH_3)_2-$, $-CH_2-$, $-SO_2-$, $-S-$, $-O-$,

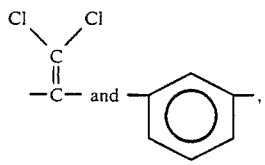

and n is an integer equal to 1 to 4 inclusive, or 2 to 4 inclusive.

EXAMPLES 5-8

In accordance with the procedure of Example 4, additional poly(organosiloxy biphenyleneoxide)s were prepared, except that in place of tetramethylbiphenol, there was used biphenol, 2,2'-di-t-butyldimethyl-6,6'-dimethyl-4, 4'-biphenol 2,2'-dimethyl-4,4'-biphenol and 2,2'-dimethyl-4,4'-biphenol.

The polyorgano siloxy biphenyleneoxides were evaluated for $T_g$, $T_m$, OI, Char Yield, and Stability (TGA). They consisted essentially of chemically combined groups of the formula,

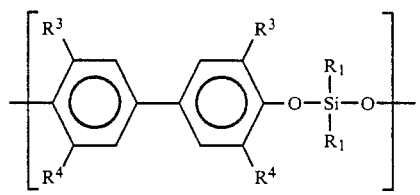

where $R^1$ is a previously defined, $R^3$, $R^4$ and Y are shown below in Table 1, OI is Oxygen Index, Me is methyl, t-Bu is tertbutyl, Ph is phenyl, TGA is Thermographic Analysis and Char Yield is as previously defined:

TABLE 1

| Example | $R^3$ | $R^4$ | $T_g$ | $T_m$ | OI | TGA Air/$N_2$ (10%) | Char Yield (Volts) |
|---|---|---|---|---|---|---|---|
| 4 | Me | Me | 138° C. | 280° C. | 52.2% | 440°/509° C. | 60(80) 47(87) |
| 5 | H | H | 71° C. | — | 64.1% | 550°/552° C. | 55(90) |
| 6 | t-Bu | Me | — | 250–280°(d) | 43.8% | 330°/415° C. | 52(80) |
| 7 | Me | H | 113° C. | — | 60.3% | 510°/550° C. | 51(90) |
| 8 | Ph | H | 85° C. | — | 53% | 537°/559° C. | 52(90) |

EXAMPLES 9-15

There was added 9.4391 grams (0.03367 mols) of tetramethylbisphenol-A in increments of 4.72 grams, 2.36 grams and 2.35 grams at half hour intervals using 10 ml dry toluene to transfer each addition to 7.82 grams (0.03367 mols) of a 50% by weight toluene solution of bis(trimethylureido)dimethyl silane maintained under a nitrogen blanket at a temperature of 78° C. The final solution had about 27% by weight solids. The temperature of the resulting solution was raised to 120° C. one hour after the final tetramethylbisphenol-A addition to maintain the toluene solution under reflux. The reaction was monitored by GPC. The mixture was refluxed for an additional hour. A poly(tetramethylbisphenol-A monosiloxane) was obtained having a $MW_w$ of 17,800. After the removal of some toluene to increase the percent solids level, additional bisuriedo silane was added to provide a 7% excess. The reaction was left at reflux for two hours and an additional 2.35 millimoles of bisuriedo silane was added to provide a 14% excess silane. The reaction was continued for two hours diluted with toluene and then cooled slightly prior to precipitation in isopropanol. There was obtained a polymer having $MW_w$ of 56,500 and $MW_n$ of 32,900 by GPC.

Following the above procedure additional poly(diaryloxy)monosiloxanes were prepared. However a different disphenol was substituted for the tetramethylbisphenol-A. The poly(biphenol)monosiloxanes consisted essentially of chemically combined groups of the formula,

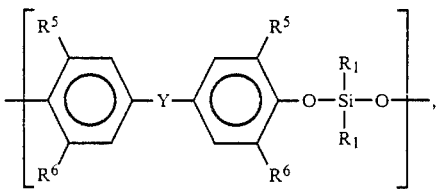

where $R^1$ is as previously defined and $R^5$, $R^6$ and Y are shown below in Table 2:

TABLE 2

| Example | Y | $R^5$ | $R^6$ | $T_g$ | $T_m$ | OI | TGA Air/$N_2$ (10%) | Char Yield (Volts) |
|---|---|---|---|---|---|---|---|---|
| 9 | C(CH$_3$)$_2$ | Me | Me | 97° C. | — | 36 | 425°/470° C. | 33(80) |
| 10 | C(CH$_3$)$_2$ | H | H | 119° C. | — | 48 | 460°/450° C. | 31(80) |
| 11 | CH$_2$ | ME | Me | 69° C. | — | 40.9 | 460°/445° C. | 40(80) |
| 12 | CH$_2$ | H | H | <38° C. | 140° | — | 500° | 49(90) |
| 13 | SO$_2$ | Me | Me | 130° C. | — | 25.4 | 335°/320° C. | 28(80) |
| 14 | S | Me | Me | 74° C. | 141°,166° 179° | 41 | 340°/370° C. | — |

TABLE 2-continued

| Example | Y | R⁵ | R⁶ | $T_g$ | $T_m$ | OI | TGA Air/N₂ (10%) | Char Yield (Volts) |
|---|---|---|---|---|---|---|---|---|
| 15 | S | H | H | <50° | — | <32 | 230° C. | 45(80) |

EXAMPLES 16-18

Additional poly(tetramethylbiphenol)siloxanes were prepared by stirring a mixture at 70° C. using a nitrogen sparge consisting of 25.35 grams(105 millimoles) of 2,6,2',6'-tetramethyl-4,4'biphenol and 25.3 grams (93 millimoles) of 1,3-dipyrrolidinyl-1,1,3,3-tetramethyldisiloxane. After stirring the mixture for 2 hours, while continuously removing the pyrrolidine byproduct, an additional 0.90 gram (3.3 millimole) of the disiloxane was added. The temperature was raised to 180° C. and after another 1 hour, another 0.90 gram (3.3 millimole) increment of the disiloxane was added. A final 0.90 gram increment of the disiloxane was added after another hour. The reaction mixture was then stirred at 180° C. for 15 hours. There was obtained a viscous polymer which was dissolved in chloroform, precipitated into a blender with methanol, redissolved in chloroform and reprecipitated into methanol to form a tacky viscous resin. There was obtained a product which consisted essentially of chemically combined groups of the formula,

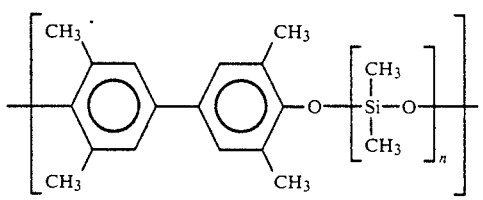
(8)

where n is defined in Table 3 below, and "FOT" is Flame Out Time:

TABLE 3

| Example | [(CH₃)₂SiO1ₙ] | Tg | OI | FOT | TGA air/N₂ (10%) | Char Yield (Volts) |
|---|---|---|---|---|---|---|
| 1 | n = 1 | 126° C. 138° C. | 52.5% | 1.44 sec | 465°/509° C. | 60-64(80) |
| 16 | n = 2 | 55° C. | 44.1% | 1.03 sec | 460°/535° C. | 51.4(80) |
| 17 | n = 3 | 14° C. | — | — | 440°/480° C. | 43.9(80) |
| 18 | n = 4 | −16° C. | — | — | −/390° C. | 41.7(90) |

Additional information about formula 8 polymers is as follows:

Example 16 poly(tetramethylbiphenol) disiloxane
Molecular Weight: $M_w/M_n = 54,000/26,300$ IV: 0.48
Tensile Properties: 30% elongation; 2730 psi (1"/min)
Flexural Modulus: 160,000; 250,000 psi
²⁹SiNMR: −14.2 ppm
¹³C NMR: 150.8, 134.3, 128.5, 126.7, 17.6, ±0.1 ppm
Example 17 poly(tetramethylbiphenol) trisiloxane
Molecular Weight: $M_w/M_n = 68,400/22,460$ IV: 0.53
Tensile Properties: 309% elongation; 157 psi (2"/min)
²⁹SiNMR: −14.9, −20.9 ppm
¹³CNMR: 151.9, 134.3, 128.5, 126.7, 17.6, 0.7, −0.1 ppm
Example 18 poly(tetramethylbiphenol)tetrasiloxane
IV: 0.19

Molecular Weight: $M_w/M_n + 30,000/14,000$
²⁹SiNMR: −14.9, −21.4 ppm
¹³CNMR: 151.0, 134.4, 128.6, 126.8, 17.7, 1.0, 0.1 ppm

EXAMPLES 19-21

The procedure of examples 9-15 was repeated, except that bisphenols were used, where Y in formula 6 is O, (example 19),

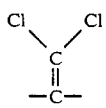

(example 20), and 1,3 phenyl (example 21) and R⁵ and R⁶ are hydrogen. The following results were obtained:

TABLE 4

| Example | Y | R⁵ | R⁶ | $T_g/T_m$ | Char Yield | OI | TGA(10%) Air/N₂ |
|---|---|---|---|---|---|---|---|
| 19 | O | H | H | 33°/— | 41.5(90) | 70.6 | 520/454° C. |
| 20 | C(C Cl₂) | H | H | 78°/— | 57.5(90) | 64 | 423/417° C. |
| 21 | 1,3 phenyl | H | H | 95.5°/— | 54.5(90) | 44.5 | 578/530° C. |

EXAMPLES 22-36

The procedure of 4 was repeated, except that in place of tetramethylbiphenol, there were used hydroquinone (example 22), 2-methylhydroquinone (example 23), 2,3-dimethyl hydroquinone (example 24), 2,3,5,6-tetramethylhydroquinone (example 25) 2-phenyl hydroquinone (example 26), resorcinol (example 27), 2-methyl resorcinol (example 28) 4-ethyl resorcinol (example 29) 2,7 naphthalenediol (example 30), 1,5 naphthalenediol (example 31) 1,4 naphthalenediol (example 32), 1,6 naphthalenediol (example 33) 2,6 naphthalenediol (example 34), an equal molar mixture of tetramethylbiphenol and tetramethylbisphenol-A (example 35) and an equal molar mixture of tetramethylbiphenol and biphenol (example 36). The following results were obtained, where Char Yield is CY% and % Char is weight percent of polymer residue after the TGA was completed:

TABLE 5

| Example | $T_G/T_M$ | CHAR YIELD (volts) | CHAR YIELD (700° N₂) | OI | TGA air/N₂ (10%) |
|---|---|---|---|---|---|
| 22 | −25°/112° | 38(90) | 26 | 62.6 | 485°/415° C. |
| 23 | 0.5/— | 39(90) | 33 | 56.3 | 436°/429° C. |

TABLE 5-continued

| Example | $T_G/T_M$ | CHAR YIELD (volts) | CHAR YIELD (700° N$_2$) | OI | TGA air/N$_2$ (10%) |
|---|---|---|---|---|---|
| 24 | 19°/— | 39.8(90) | 48 | 62. | 450°/470° C. |
| 25 | 45°/— | 46(90) | 43 | 48.5 | 438°/466° C.* |
| 26 | 42.6°/— | 46.5(90) | 53 | 58. | 460°/480° C. |
| 27 | −14°/— | 12.3(90) | 2.5 | 60.3 | 365°/410° C.** |
| 28 | 3.5°/— | 42.3(90) | 34.5 | 53. | 380°/455° C. |
| 29 | −14°/— | 17.2(90) | 16 | 49-57 | 313°/347° C.** |
| 30 | 45°/— | 52/62(90) | 42 | 54.4 | 560°/470° C. |
| 31 | 61.7°/148° | 52(90) | 46 | 53.5. | 557°/511° C. |
| 32 | 54° | 39(90) | 33 | 62.5 | 447°/454° C. |
| 33 | 51° | 49(90) | 27 | >72 | 557°/536° C. |
| 34 | 54° | 63/(90) | 54 | 57.6 | 568°/484° C. |
| 35 | 109°/— | 44(90) | 47 | 49.3 | 445°/485° C. |
| 36 | 94.5°/— | 55.3(90) | 58.5 | 54.4 | 485°/511° C. |

*partly crosslinked
**MW$_n$ lowered an order of magnitude on standing (150K-15K)

Although the above examples are directed to only a few of the very many variables which can be used in the practice of the present invention, it should be understood that the present invention is directed to a much broader variety of polymeric reaction products of biphenols and organosilicon materials and method for making such materials as set forth in the description preceding these examples.

What is claimed is:

1. A method for making a poly(silyloxytetraalkylbiphenyleneoxide) having improved char yield comprising, (A) effecting reaction between a tetraalkylbiphenol of the formula,

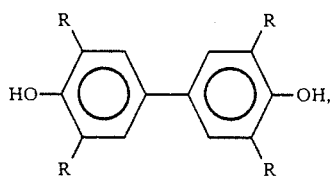

and a difunctional organosilicon material selected from the class consisting of a polyorganosiliazane, a cyclopolyorganosilazane, a bisureidosilane and an organosilane of the formula,

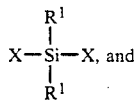

(B) recovering the resulting poly(silyloxytetraalkylbiphenyleneoxide) from the mixture of (A), where R is selected from the same or different $C_{(1-8)}$ alkyl radicals, $R^1$ is selected from the same or different $C_{(1-13)}$ monovalent hydrocarbon radicals or $C_{(1-13)}$ monovalent hydrocarbon radicals substituted with monovalent radicals inert during condensation, and X is a hydrolyzable radical.

2. A method in accordance with claim 1, where the tetraalkylbiphenol is tetramethylbiphenol.

3. A method in accordance with claim 1, where the difunctional organosilicon material is dimethyldichlorosilane.

4. A method in accordance with claim 1, where the cyclopolyorganosilane is octamethylcyclotetrasilazane.

5. A method for making polymeric reaction products comprising, (C) effecting reaction between a dihydric phenol of the formula,

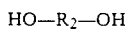

HO—R$_2$—OH and a difunctional organosilicon material selected from the class consisting of a polyorganosilazane, a cyclopolyorganosilazane, a bisureidosilane an α, ω bisaminopolysiloxane and an organosilane of the formula,

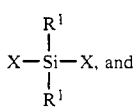

(D) recovering the polymeric reaction product from (C), wherein $R^1$ is selected from the same or different $C_{(1-13)}$ monovalent hydrocarbon radicals, or $C_{(1-13)}$ monovalent hydrocarbon radicals substituted with monovalent radicals inert during condensation, $R^2$ is a member selected from the class consisting of,

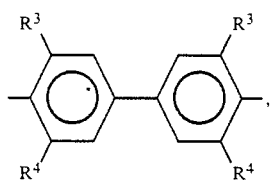

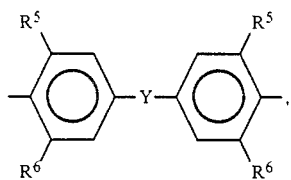

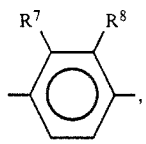

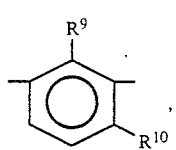

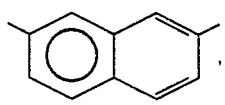

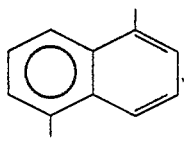

-continued

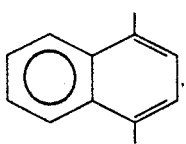

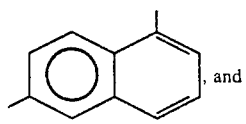, and

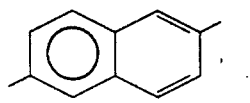, $R^3$, $R^4$, $R^5$, $R^6$, $R^7$, $R^8$, $R^9$ and $R^{10}$ are members of a class selected from the same or different $C_{(1-13)}$ monovalent hydrocarbon radicals, Y is a member selected from the class consisting of —C(CH$_3$)$_2$—, —CH$_2$—, —SO$_2$—, —S—, —O—,

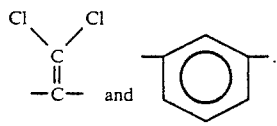 and 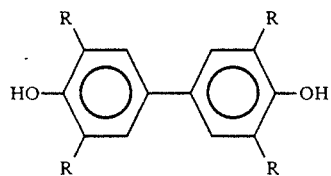.

6. A method in accordance with claim 5, where the dihydric phenol is,

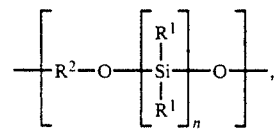

and R is the same or different, $C_{(1-8)}$ alkyl radicals

7. A method in accordance with claim 5, where the difunctional organosilican material is a cyclopolyorganosilazane.

8. A method in accordance with claim 5, where the difunctional organosilican material is a bisureidosilane.

9. A polymeric reaction product of a dihydric phenol and an organosilicon material consisting essentially of chemically combined groups of the formula, $$\left[ R^2 - O - \left[ \begin{array}{c} R^1 \\ | \\ Si \\ | \\ R^1 \end{array} \right]_n - O \right],$$

where $R^1$ is selected from the same or different $C_{(1-13)}$ monovalent hydrocarbon radicals, or $C_{(1-13)}$ monovalent hydrocarbon radicals substituted with monovalent radicals inert during condensation, $R^2$ is a member selected from the class consisting of,

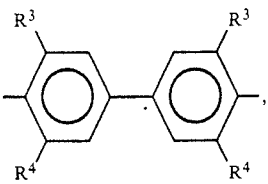

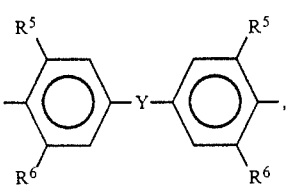

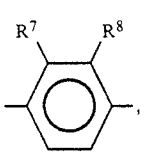,

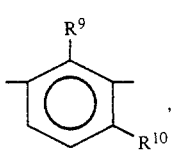,

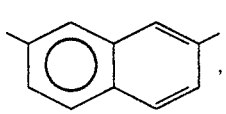

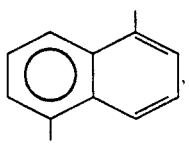,

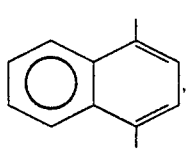,

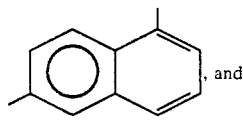, and

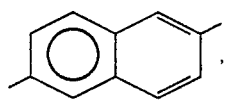,

Y is a member selected from the class consisting of —C(CH$_3$)$_2$—, —CH$_2$—, —SO$_2$—, —S—, —O—,

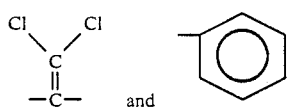

$R^3$, $R^4$, $R^5$, $R^6$, $R^7$, $R^8$, $R^9$ and $R^{10}$ are members or a class selected from the same or different $C_{(1-13)}$ monovalent hydrocarbon radicals, and n is an integer equal to 1 to 4 inclusive.

10. Poly(silyloxytetraalkylbiphenyleneoxide)s consisting essentially of chemically combined groups of the formula

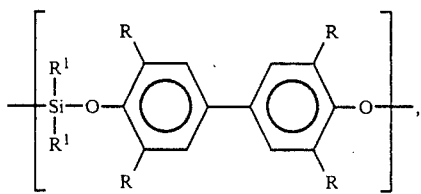

where R is selected from the same or different $C_{(1-8)}$ alkyl radicals, $R^1$ is selected from the same or different $C_{(1-13)}$ monovalent hydrocarbon radicals, or $C_{(1-13)}$ monovalent hydrocarbon radicals substituted with monovalent radicals inert during condensation.

11. Poly(biphenol)monosiloxanes consisting essentially of chemically combined groups of the formula,

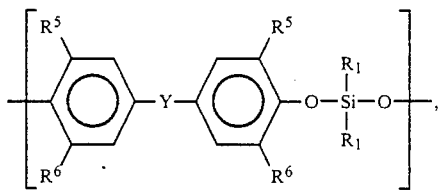

where $R^1$ is selected from the same or different $C_{(1-13)}$ monovalent hydrocarbon radicals, or $C_{(1-13)}$ monovalent hydrocarbon radicals substituted with monovalent radicals neutral during equilibration, $R^5$ and $R^6$ are members of a class selected from the same or different $C_{(1-13)}$ monovalent hydrocarbon radicals, and Y is a member selected from the class consisting of —C(CH$_3$)$_2$—, —CH$_2$—, —SO$_2$—, —S—, —O—,

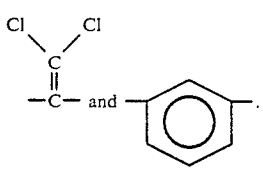 and 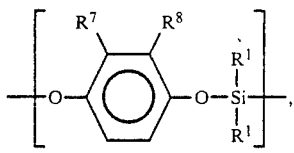.

12. Poly(hydroquinone monosiloxane)s consisting essentially of chemically combined groups of the formula,

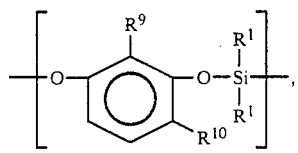

where $R^1$ is selected from the same or different $C_{(1-13)}$ monovalent hydrocarbon radicals, or $C_{(1-13)}$ monovalent hydrocarbon radicals substituted with monovalent radicals insert during condensation and $R^7$ and $R^8$ are members or a class selected from the same or different $C_{(1-13)}$ monovalent hydrocarbon radicals.

13. Poly(resorcinol monosiloxane)s consisting essentially of chemically combined groups of the formula,

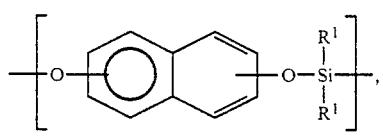

where $R^1$ is selected from the same or different $C_{(1-13)}$ monovalent hydrocarbon radicals, or $C_{(1-13)}$ monovalent hydrocarbon radicals substituted with monovalent radicals inert during condensation and $R^9$ and $R^{10}$ are members or a class selected from the same or different $C_{(1-13)}$ monovalent hydrocarbon radicals.

14. Poly(binaphthol monosiloxane)s having the formula,

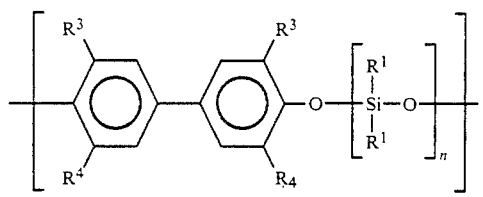

where $R^1$ is selected from the same or different $C_{(1-13)}$ monovalent hydrocarbon radicals, or $C_{(1-13)}$ monovalent hydrocarbon radicals substituted with monovalent radicals inert during condensation.

15. Poly (tetraorganobiphenol) siloxanes consisting essentially of chemically combined groups of the formula, where $R^1$ is selected from the same or different $C_{(1-13)}$ monovalent hydrocarbon radicals, or $C_{(1-13)}$ monovalent hydrocarbon radicals substituted with monovalent radicals inert during condensation and $R^3$ and $R^4$ are members of a class selected from the same or different $C_{(1-13)}$ monovalent hydrocarbon radicals and n is an integer equal to 1 to 4 inclusive.

16. Poly(silyloxytetraalkylbiphenyleneoxide)s in accordance with claim 10, where R and $R^1$ are methyl.

17. A poly(dimethylsilyloxytetramethylbiphenyleneoxide).

* * * * *